(12) United States Patent
Landers et al.

(10) Patent No.: US 12,353,883 B2
(45) Date of Patent: *Jul. 8, 2025

(54) EXECUTING MEMORY REQUESTS OUT OF ORDER

(71) Applicant: Imagination Technologies Limited, Kings Langley (GB)

(72) Inventors: Mark Landers, Hertfordshire (GB); Martin John Robinson, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 1201 days.

This patent is subject to a terminal disclaimer.

(21) Appl. No.: 17/159,019

(22) Filed: Jan. 26, 2021

(65) Prior Publication Data

US 2021/0157596 A1    May 27, 2021

Related U.S. Application Data

(63) Continuation of application No. 15/621,042, filed on Jun. 13, 2017, now Pat. No. 10,929,138.

(30) Foreign Application Priority Data

Jun. 14, 2016   (GB) ...................... 1610328

(51) Int. Cl.
    *G06F 9/38*       (2018.01)
    *G06F 9/30*       (2018.01)
    (Continued)

(52) U.S. Cl.
    CPC ........ *G06F 9/3836* (2013.01); *G06F 9/30087* (2013.01); *G06F 9/3834* (2013.01);
    (Continued)

(58) Field of Classification Search
    CPC .. G06F 9/30087; G06F 9/3834; G06F 9/3836; G06F 12/0815; G06F 13/1626; G06F 13/1689; G06F 13/1631
    See application file for complete search history.

(56) References Cited

U.S. PATENT DOCUMENTS

6,148,371 A   11/2000 Hetherington et al.
6,360,298 B1   3/2002 Osanai et al.
(Continued)

FOREIGN PATENT DOCUMENTS

CN    101861571 A    10/2010
EP    0843262 A2    5/1998

OTHER PUBLICATIONS

Franklin et al., "ARB: A Hardware Mechanism for Dynamic Reordering of Memory References," IEEE Transactions on Computers, vol. 46, No. 5, May 1996, pp. 552-571.

*Primary Examiner* — Jacob Petranek
(74) *Attorney, Agent, or Firm* — Potomac Law Group, PLLC; Vincent M DeLuca

(57) ABSTRACT

An on-chip cache is described which receives memory requests and in the event of a cache miss, the cache generates memory requests to a lower level in the memory hierarchy (e.g. to a lower level cache or an external memory). Data returned to the on-chip cache in response to the generated memory requests may be received out-of-order. An instruction scheduler in the on-chip cache stores pending received memory requests and effects the re-ordering by selecting a sequence of pending memory requests for execution such that pending requests relating to an identical cache line are executed in age order and pending requests relating to different cache lines are executed in an order dependent upon when data relating to the different cache lines is returned. The memory requests which are received may be (Continued)

received from another, lower level on-chip cache or from registers.

17 Claims, 8 Drawing Sheets

(51) Int. Cl.
    *G06F 12/0815*     (2016.01)
    *G06F 13/16*     (2006.01)
    *G06F 13/40*     (2006.01)

(52) U.S. Cl.
    CPC ...... *G06F 12/0815* (2013.01); *G06F 13/1689* (2013.01); *G06F 9/3861* (2013.01); *G06F 13/4013* (2013.01); *G06F 2212/60* (2013.01); *Y02D 10/00* (2018.01)

(56) References Cited

U.S. PATENT DOCUMENTS

| | | | |
|---|---|---|---|
| 6,487,640 | B1 * | 11/2002 | Lipasti ................ G06F 12/0859 712/E9.046 |
| 7,587,521 | B2 * | 9/2009 | Akiyama ............ G06F 13/1626 710/5 |
| 7,870,351 | B2 | 1/2011 | Resnick |
| 9,471,320 | B2 * | 10/2016 | Venkatasubramanian ................... G06F 9/30036 |
| 2003/0217239 | A1 | 11/2003 | Jeddeloh |
| 2007/0113019 | A1 | 5/2007 | Beukema et al. |
| 2009/0063735 | A1 | 3/2009 | Ng et al. |
| 2009/0138662 | A1 | 5/2009 | Lauterbach |
| 2010/0122033 | A1 | 5/2010 | Gebara et al. |
| 2016/0019151 | A1 | 1/2016 | Venkatasubramanian et al. |

* cited by examiner

EXECUTING MEMORY REQUESTS OUT OF ORDER

CROSS-REFERENCE TO RELATED APPLICATIONS AND CLAIM OF PRIORITY

This application is a continuation under 35 U.S.C. 120 of copending application Ser. No. 15/621,042 filed Jun. 13, 2017, now U.S. Pat. No. 10,929,138, which claims foreign priority under 35 U.S.C. 119 from United Kingdom Application No. 1610328.5 filed Jun. 14, 2016, the contents of which are incorporated by reference herein in their entirety.

BACKGROUND

In order to reduce the latency associated with accessing data stored in main memory, processors (such as CPUs or GPUs) typically have one or more caches, as shown in the example memory hierarchy 100 in FIG. 1. There are typically two levels of on-chip cache, L1 102 and L2 104 which are usually implemented with SRAM (static random access memory). The caches are smaller than the main memory 108, which may be implemented in DRAM (dynamic random access memory), but the latency involved with accessing a cache is much shorter than for main memory, and gets shorter at lower levels within the hierarchy (i.e. closer to the processor in terms of both the processing chain and physical distance). As the latency is related, at least approximately, to the size of the cache, a lower level cache (e.g. L1) is smaller than a higher level cache (e.g. L2).

When a processor accesses a data item, the data item is accessed from the lowest level in the hierarchy where it is available. For example, a look-up will be performed in the L1 cache 102 and if the data is in the L1 cache, this is referred to as a cache hit and the data can be loaded into one of the registers 110. If however, the data is not in the L1 cache (the lowest level cache), this is a cache miss and the next levels in the hierarchy are checked in turn until the data is found (e.g. L2 cache 104 is checked in the event of a L1 cache miss). In the event of a cache miss, the data is brought into the cache (e.g. the L1 cache 102) and if the cache is already full, a replacement algorithm may be used to decide which existing data will be evicted (i.e. removed) in order that the new data can be stored.

If a data item is not in any of the on-chip caches (e.g. not in the L1 cache 102 or the L2 cache 104 in the hierarchy shown in FIG. 1), then a memory request is issued onto an external bus (which may also be referred to as the interconnect fabric or memory fabric) so that the data item can be obtained from the next level in the hierarchy (e.g. the main memory 108).

The embodiments described below are provided by way of example only and are not limiting of implementations which solve any or all of the disadvantages of known on-chip caches.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An on-chip cache is described which receives memory requests and in the event of a cache miss, the cache generates memory requests to a lower level in the memory hierarchy (e.g. to a lower level cache or an external memory). Data returned to the on-chip cache in response to the generated memory requests may be received out-of-order. An instruction scheduler stores in the on-chip cache pending received memory requests and effects the re-ordering by selecting a sequence of pending memory requests for execution such that pending requests relating to an identical cache line are executed in age order and pending requests relating to different cache lines are executed in an order dependent upon when data relating to the different cache lines is returned. The memory requests which are received may be received from another, lower level on-chip cache or from registers.

A first aspect provides an on-chip cache which is part of a memory hierarchy of a processor formed on a chip with the on-chip cache, the on-chip cache comprising an instruction scheduler, wherein the instruction scheduler comprises: a first input arranged to receive memory requests generated in the processor; a cache management unit arranged, in response to determining that a received memory request refers to data that is not stored in the on-chip cache, to generate a memory request on a further level of the memory hierarchy; a second input arranged to receive data returned from the further level in the memory hierarchy in response to memory requests generated in the cache management unit; and a re-order buffer module arranged to control an order in which received memory requests are executed within the on-chip cache and comprising a data structure arranged to store pending memory requests, and wherein data is received via the second input in an order that is different from an order in which the corresponding memory requests are received via the first input.

A second aspect provides a memory hierarchy of a processor comprising: a first on-chip cache formed on a chip with the processor; a second on-chip cache formed on the chip with the processor as described herein; and a memory external to the chip.

A third aspect provides a method of operating an on-chip cache which is part of a memory hierarchy of a processor formed on a chip with the on-chip cache, the method comprising: receiving a memory request generated in the processor and storing it in a data structure; determining if the memory request refers to data that is not stored in the on-chip cache; in response to determining that the memory request refers to data that is not stored in the on-chip cache, generating a memory request on a further level of the memory hierarchy; receiving data returned from the further level in the memory hierarchy in response to memory requests generated in the on-chip cache in an order that is different from an order in which the corresponding memory requests generated in the processor are received by the on-chip cache; and controlling an order in which the received memory requests are executed within the on-chip cache.

A fourth aspect provides computer readable code configured to perform the steps of the method as described herein when the code is run on a computer. A fifth aspect provides a computer readable storage medium having encoded thereon the computer readable code of the fourth aspect.

A sixth aspect provides a method of manufacturing, at an integrated circuit manufacturing system, an on-chip cache as described herein.

A seventh aspect provides an integrated circuit definition dataset that, when processed in an integrated circuit manufacturing system, configures the integrated circuit manufacturing system to manufacture an on-chip cache as described herein.

An eighth aspect provides a computer readable storage medium having stored thereon an integrated circuit definition dataset that, when processed in an integrated circuit manufacturing system, configures the system to manufacture an on-chip cache as described herein.

A ninth aspect provides a memory hierarchy of a processor comprising: a first on-chip cache formed on a chip with the processor; a second on-chip cache formed on the chip with the processor as described herein; and a memory external to the chip.

The cache, or part thereof, may be embodied in hardware on an integrated circuit. There may be provided a method of manufacturing, at an integrated circuit manufacturing system, a cache, or part thereof. There may be provided an integrated circuit definition dataset that, when processed in an integrated circuit manufacturing system, configures the system to manufacture a cache, or part thereof. There may be provided a non-transitory computer readable storage medium having stored thereon a computer readable description of an integrated circuit that, when processed, causes a layout processing system to generate a circuit layout description used in an integrated circuit manufacturing system to manufacture a cache, or part thereof.

There may be provided an integrated circuit manufacturing system comprising: a non-transitory computer readable storage medium having stored thereon a computer readable integrated circuit description that describes the cache, or part thereof; a layout processing system configured to process the integrated circuit description so as to generate a circuit layout description of an integrated circuit embodying the cache, or part thereof; and an integrated circuit generation system configured to manufacture the cache, or part thereof, according to the circuit layout description.

There may be provided computer program code for performing a method as described herein. There may be provided non-transitory computer readable storage medium having stored thereon computer readable instructions that, when executed at a computer system, cause the computer system to perform the method as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings, in which.

Figure 1:
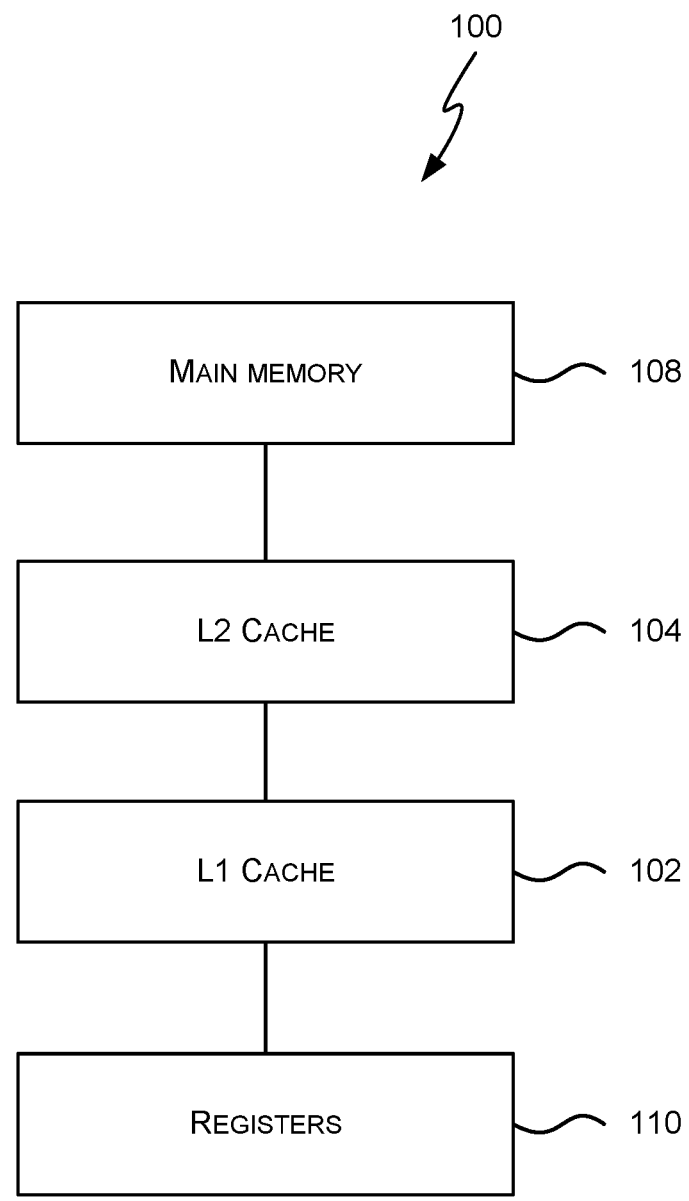
FIG. 1 is a schematic diagram of an example memory hierarchy.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

Described herein is an on-chip (or on-die) cache (i.e. a cache which is on the same chip/die as a processor and which is typically attached to the processor but may be shared, e.g. between the processor and a second processor) which is part of a memory hierarchy (e.g. as shown in FIG. 1). The on-chip cache receives memory requests from a lower level in the memory hierarchy (e.g. from a lower level on-chip cache or from registers), where these received memory requests may be reads only or may be reads or writes. In response to determining that the data to which the memory request relates is not stored in the on-chip cache (i.e. in response to a cache miss), the on-chip cache generates one or two new memory requests to the next level in the memory hierarchy (i.e. the next level going higher in the memory hierarchy). Depending upon where the on-chip cache sits in the memory hierarchy, the generated memory requests may be transmitted directly to the next level or may be transmitted to an intermediary module (e.g. a converter module) which transmits them on to the next level in the hierarchy. Data which is returned from the next level hierarchy in response to the generated memory requests may be out of order (i.e. the data may be returned in a different order from the received memory requests to which it relates) and the on-chip cache performs re-ordering passing the returned data back through the memory hierarchy (i.e. before returning the data to the part of the memory hierarchy from which the original memory requests were received).

In various examples, the on-chip cache may operate as the last (i.e. highest) level of on-chip cache (i.e. the on-chip cache which is furthest from the processor), e.g. the L2 cache 104 in the hierarchy 100 shown in FIG. 1. In such an example, the on-chip cache receives memory requests from a lower level on-chip cache (e.g. the L1 cache 102 in the hierarchy 100 shown in FIG. 1) or from registers (e.g. where there is only one on-chip cache, an L1 cache). In response to a cache miss in the on-chip cache, the on-chip cache generates one or two requests to off-chip memory since there is no higher level on-chip memory (e.g. it generates one or two requests to main memory 108 in the hierarchy 100 shown in FIG. 1). These requests to memory may be passed to an intermediary module (e.g. a converter module) which actually issues the memory requests onto an external bus so that they can be received by the off-chip memory.

In examples where the on-chip cache operates in virtual memory address space (and hence generates requests to memory in virtual memory address space) and the higher level in the hierarchy (to which the generated memory requests are transmitted) operates in physical memory address space, the intermediary module (e.g. the converter module) converts the generated memory requests. For example, where the on-chip cache is the last on-chip cache and operates in virtual memory address space, the converter module converts the generated memory requests into a protocol used on the external bus which is in physical address space (e.g. AXI 4 ACE protocol) and the translation from virtual memory address space to physical address space is performed using a memory management unit (MMU). In other examples where the on-chip cache operates in physical address space, this conversion is not required and the intermediary module may just issue the generated requests onto the external bus or pass them to the next cache depending upon whether the next element in the hierarchy is on-chip or not.

In examples where the next level in the memory hierarchy to which the generated requests are passed (e.g. the external bus and off-chip memory) operates out-of-order, data returned in response to the generated requests may also be out-of-order. Consequently many existing memory hierarchies include an intermediate buffer (e.g. within the converter module or between the external bus and the last on-chip cache) which re-orders the data before it is received by the last on-chip cache, i.e. so that the last on-chip cache receives data back from the external memory in exactly the same order as the cache misses and hence in exactly the same order as memory requests it generates (which means that misses on different cache lines cannot 'overtake' each other).

The memory hierarchy described herein does not use any intermediate buffer to re-order the data returned to the on-chip cache by the next (higher) level in the hierarchy in response to the generated memory requests and the returned data is not put back into order prior to receipt by the on-chip cache (i.e. it is not re-ordered within an intermediary module). Instead, in the memory hierarchy described herein the on-chip cache is used to effect the re-ordering and memory requests (whether they are cache hits or cache misses) that follow a cache miss which relates to a different cache line are not stalled but are able to overtake such cache misses. For example, if there is a miss on cache line A, a subsequent cache hit or miss on cache line B is not always stalled (as may occur in prior art systems) but can be executed before the data returns for the miss on cache line A (but subsequent requests to cache line A are delayed as a consequence of the cache miss on cache line A). As a consequence of the fact that requests on other cache lines can overtake misses, the latency of the on-chip cache is reduced and the latency tolerance is substantially proportional to the size of the on-chip cache as the cache is limited to a single outstanding cache miss for each cache line (hence greater increases in latency tolerance are seen for larger caches that implement the techniques described herein compared to smaller caches). The latency is also reduced as there are fewer steps for the data to be read out of the cache and fewer dead cycles where the cache would otherwise be waiting for data which has not yet returned from memory. Additionally, the lack of intermediate buffer results in a reduction in the power consumption and physical size of the overall memory hierarchy.

The on-chip cache described herein includes a data structure which stores the pending incoming memory requests (i.e. those that are waiting to execute as a consequence of a cache miss in the on-chip cache) in age order. The memory requests stored relate to cache hits, cache misses (i.e. where the data is not available in the on-chip cache at the time the requests are received from a lower level cache by the on-chip cache) and also to subsequent memory requests which relate to the same cache line as a pending cache miss (and which may be considered cache hits because the request to the next level in the memory hierarchy for the data has already been generated). As described in more detail below, there can only be one outstanding cache miss per cache line.

The on-chip cache operates an execution policy that determines which one of the stored memory requests is executed in any clock cycle. This execution policy specifies that instructions relating to the same cache line are always executed in age order (which may also be referred to as submission order), starting with the oldest stored instruction. Additionally, in many examples, the execution policy specifies that instructions that can be executed (e.g. because the data for the cache line to which the instruction refers has been received from the next level in the memory hierarchy) are executed in age order. In various examples, however, pending cache misses (i.e. pending memory requests that resulted in a miss in the on-chip cache) may be prioritized (e.g. such that when a miss returns, the data is paired with instructions that required the returned data and these paired instructions are prioritized), such that in any clock cycle, the oldest cache miss that can be executed (e.g. because the data for the cache line to which the instruction refers has been received from the next level in the memory hierarchy) is executed and if no cache miss can be executed, cache hits are executed in age order (i.e. oldest first).

Efficiency of the on-chip cache is improved by pairing up returned data with instructions that required the returned data and then prioritizing the paired instructions. This is because the returned data has to be written into the cache and by pairing up the returned data and the instruction, the cache can both process the miss data and execute a useful instruction at the same time.

As described in more detail below, the data structure which stores the pending incoming memory requests (which may also be referred to as 'pending instructions' within the on-chip cache) may comprise a plurality of FIFOs, one for each cache line. Alternatively, they may comprise RAM and/or registers which are managed as a circular buffer whilst allowing entries to be picked out for execution in any order (subject to the execution policy described above). Use of individual FIFOs for each cache line is less flexible and hence efficient than managing RAM and/or registers as a single circular buffer because the memory is not re-assignable to different cache lines. Different requestors have different access patterns (where a requestor may, for example, be software running on the processor and accessing the memory, such as a single thread or application, or different modules accessing memory such as a lower-level texture cache or a geometry processing module in a GPU) and as a result some cache lines may be read repeatedly (and hence have many pending requests) and others may be only read once (and hence have a maximum of one pending request). Where FIFOs are used, the memory allocated to a cache line that is read rarely cannot be reassigned to store pending requests for a cache line that is read very frequently. In contrast, where the memory is managed as a circular buffer, memory is dynamically allocated when a cache line is read and a request needs to be stored.

Figure 2:
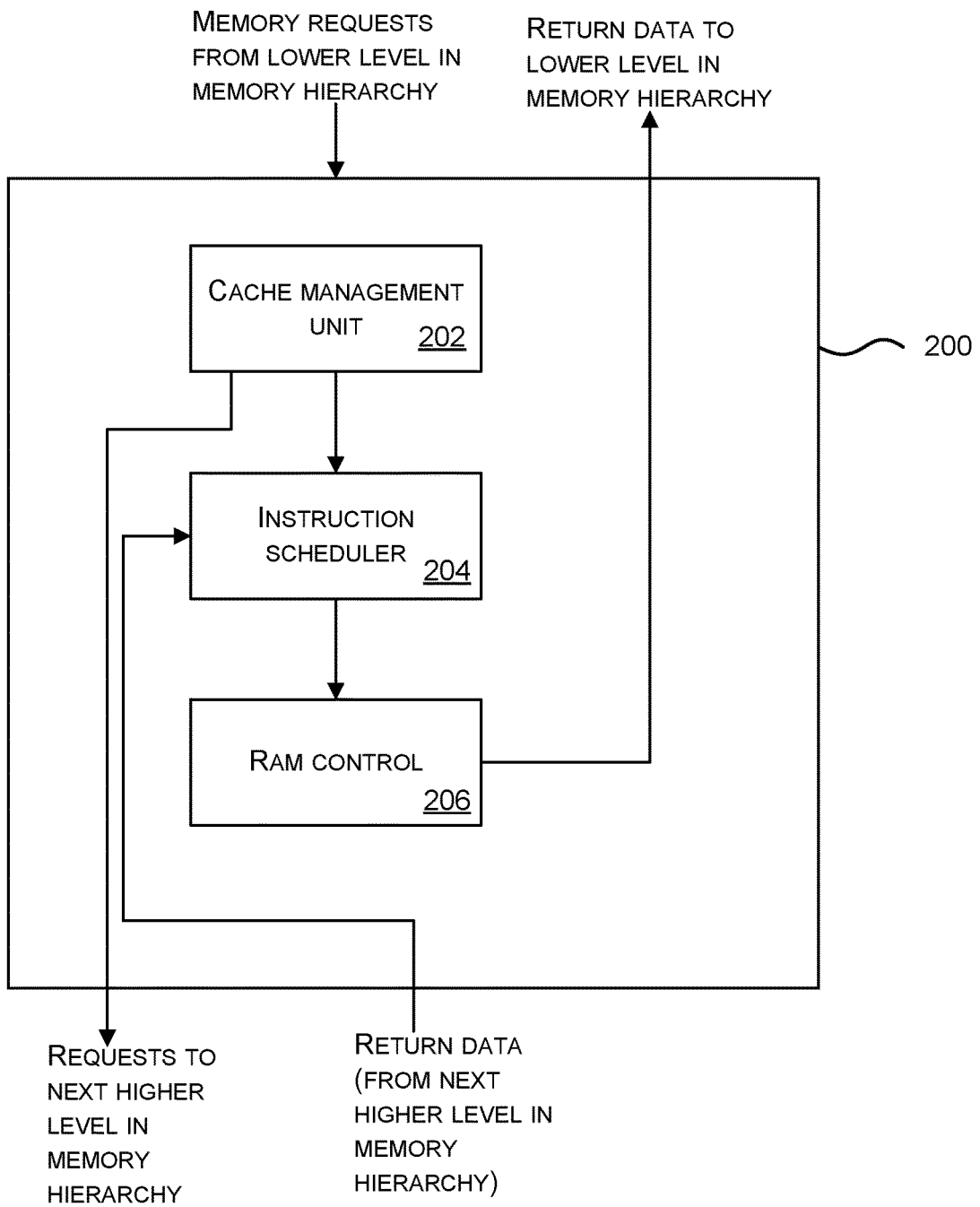
FIG. 2 is a schematic diagram of an example on-chip cache.

FIG. 2 is a schematic diagram of an example on-chip cache 200 (e.g. which may be the last on-chip cache, such as the L2 cache 104 shown in FIG. 1 or another on-chip cache, such as the L1 cache 102 shown in FIG. 1). The cache 200 comprises a cache management unit (CMU) 202, an instruction scheduler 204 and a RAM control module 206 and each of these elements are described in more detail below. It will be appreciated that the cache 200 may comprise additional elements not shown in FIG. 2. It will further be appreciated that a cache may comprise multiple cache banks (where a cache bank is an independent set of cache lines that are managed independently) and so the cache 200 shown in FIG. 2 may be a single cache bank and may be duplicated to provide multiple independent cache banks within a single cache.

Figure 3:
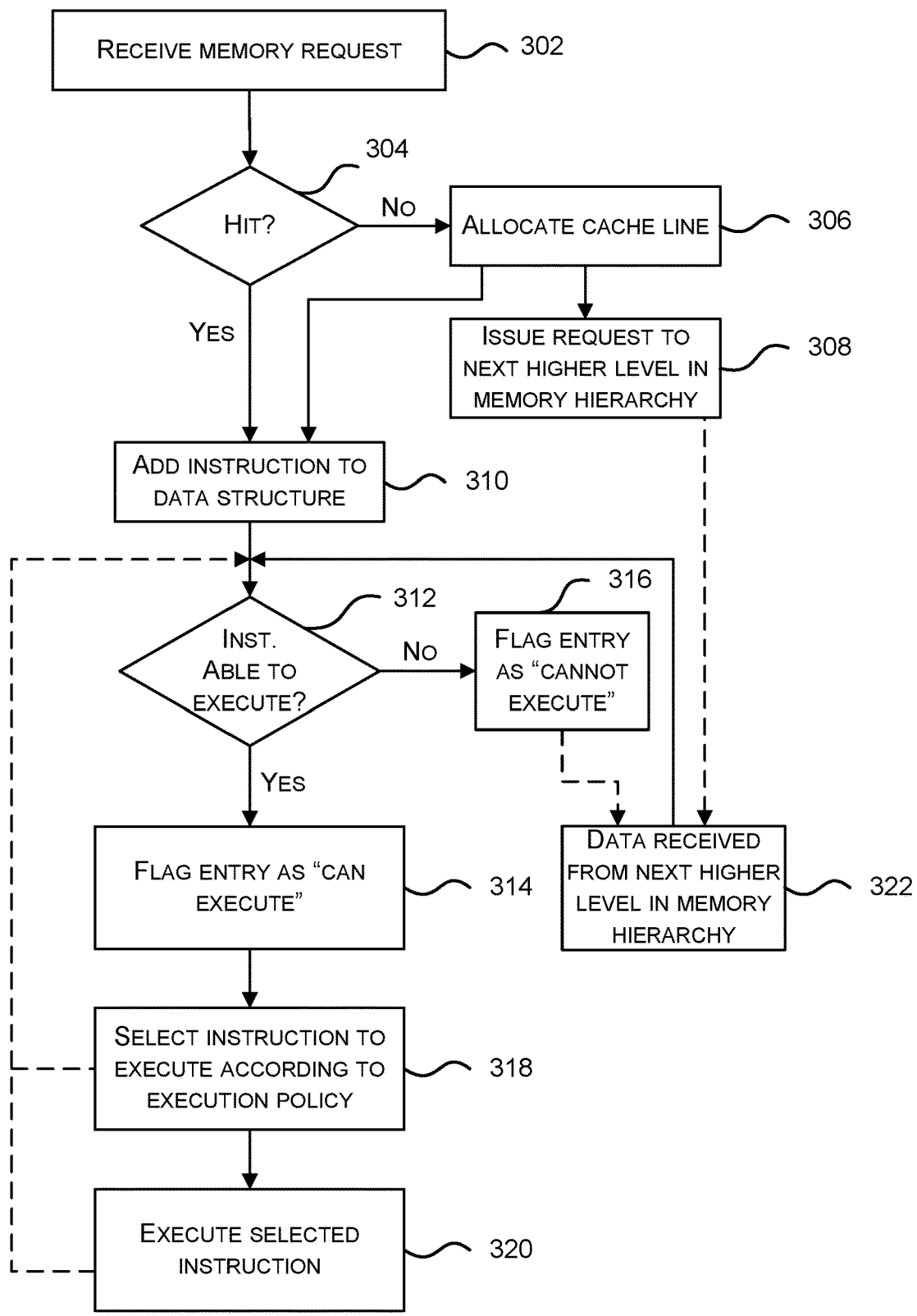
FIG. 3 is a flow diagram of an example method of operation of the cache shown in FIG. 2.

The operation of the cache 200 can be described at a high level with reference to the flow chart of FIG. 3. When the cache (or cache bank) 200 receives a memory request (block 302), the CMU 202 performs a look-up to determine if the request hits or misses on the cache (block 304). In the event of a miss ('No' in block 304), a cache line is allocated (block 306) and a request to the next level in the memory hierarchy is issued (block 308). As noted above, the term 'cache hit' is used in the context of this flow diagram to refer to when the cache already contains the required data or to when the cache does not yet contain the required data but has already issued a request to the next level in the memory hierarchy for the data. Consequently, the term 'cache hit' in the context of this flow diagram refers to a situation when a cache line has already been allocated to the particular memory address (which as described above, may be in virtual memory address space) irrespective of whether that cache line has been populated with the correct data (i.e. the data is actually in the cache) or whether the data to store in the cache line has been requested from the next level in the memory hierarchy but not yet returned.

Irrespective of whether the request hits or misses on the cache, the request (which is referred to as an instruction within the cache) is added to a data structure within the cache (block 310) and is flagged as either being able to be executed ('Yes' in block 312 followed by block 314) or not being able to be executed ('No' in block 312 followed by block 316). An instruction is able to be executed ('Yes' in block 312) if the data is stored in the corresponding cache line and as long as there is no other pending instruction which must be executed prior to that instruction. An instruction is not able to be executed ('No' in block 312) if the data is not yet stored in the corresponding cache line and/or if there is a pending instruction which must be executed prior to that instruction. These "can execute" and "cannot execute" flags may be implemented in any suitable manner and an example using two masks is described below. As described in more detail below, the flag assigned to an instruction is not static but instead the flag is updated dynamically in response to data returning from the next level in the memory hierarchy and/or instructions being executed.

The instruction scheduler 204 looks for instructions which are able to execute on any given cycle and selects an instruction (i.e. selects a currently pending instruction) to execute according to the specified execution policy (block 318). The selected instruction can then be issued from the instruction scheduler 204 to the RAM control module 206 and executed by the RAM control module 206 and data returned through the cache hierarchy.

When data returns from memory (block 322, where this data corresponds to an earlier cache miss, 'No' in block 304, which resulted in the generation of a request to the next level in the memory hierarchy in block 308), this is stored in the corresponding cache line in the physical memory (e.g. RAM) in the RAM control module 206 and the instruction scheduler 204 is notified in order to search for pending instructions which are waiting for the particular cache line (and hence are currently flagged "cannot execute"). Such instructions can then be flagged as being able to be executed ('Yes' in block 312 followed by block 314) as long as there are no other pending instructions which must be executed prior to that instruction.

When an instruction is executed by the RAM control module 206 (in block 320) or selected for execution by the instruction scheduler 204 (in block 318), the instruction scheduler 204 may also be notified in order to search for pending instructions (which are currently flagged "cannot execute") which are waiting for the instructions which has just executed to execute. Such instructions can then be flagged as being able to be executed ('Yes' in block 312 followed by block 314) as long as the required data has been returned from external memory and there are no other pending instructions which must be executed prior to that instruction.

Figure 4:
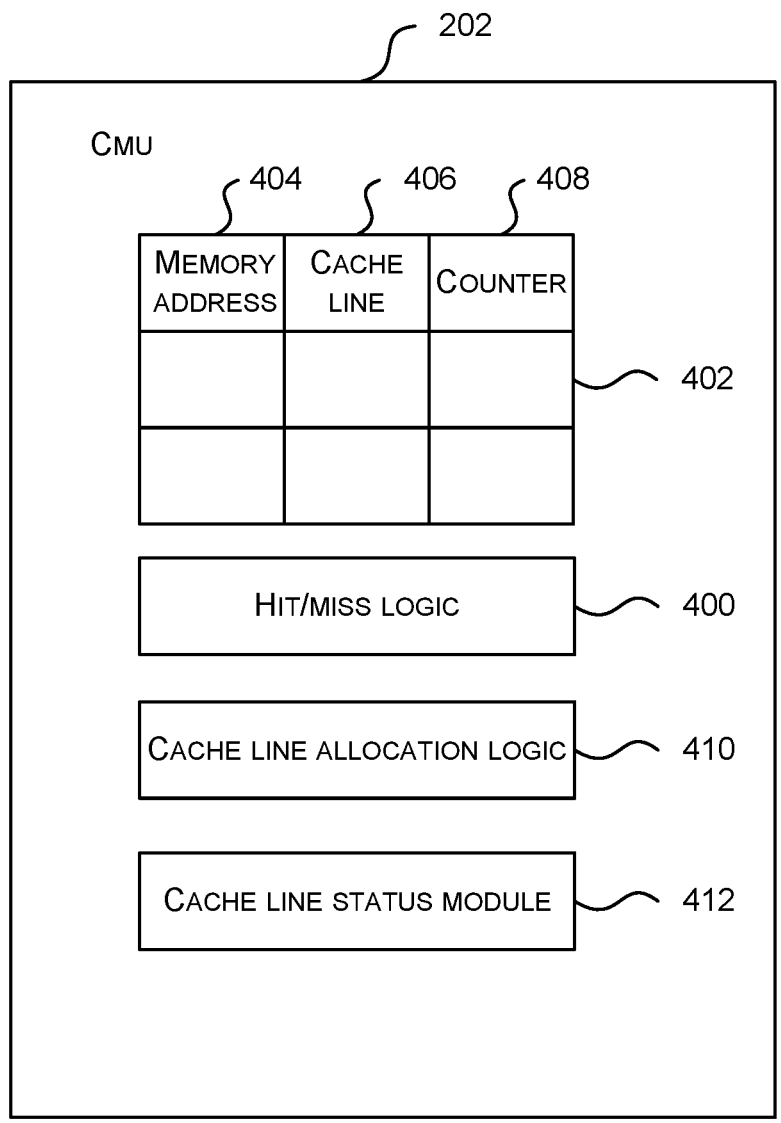
FIG. 4 is a schematic diagram showing an example cache management unit in more detail.

FIG. 4 is a schematic diagram showing an example CMU 202 in more detail. As described above, the CMU 202 receives an incoming memory request from a lower level cache (in block 302 e.g. from an L1 cache) and determines, in hit/miss logic 400, if that request hits or misses on the cache (in block 304) based on the incoming address, which may be in virtual memory address space. The CMU 202 comprises a data store 402 (which may be referred to as the 'cache line status module') that records which memory addresses have been assigned to which cache lines and as shown in FIG. 4, the data store 402 may comprise a plurality of entries, each storing an association (or link) between a memory address 404 and a cache line 406. Although the cache line is shown as a separate field 406 in each entry in the data store 402, it will be appreciated that the association may be stored in other ways (e.g. each entry in the data store 402 may be associated with a particular cache line and hence by storing a memory address in a particular entry, an association between a memory address and cache line is recorded). The hit/miss logic 400 therefore uses the data store 402 to determine (in block 304) if an incoming request hits or misses on the cache.

In the event that the incoming request is a cache miss ('No' in block 304 and as determined in the hit/miss logic 400), the CMU 202 (e.g. the cache line allocation logic 410) allocates a cache line to the memory address identified in the incoming request (in block 306) and generates a request to the next level in the memory hierarchy (in block 308). The cache line which is allocated is determined based on the data stored in the data store 402 (e.g. an unallocated cache line may be allocated or data may be evicted from a cache line which is already allocated according to a cache replacement/eviction policy) and the allocation is then recorded in the data store 402 (e.g. by the cache line status module 412 which receives allocation information from the cache line allocation logic 410).

As shown in FIG. 4, the data store 400 may also store a counter 408 associated with each allocated cache line. This counter records the number of outstanding requests (or accesses) on each cache line and so when a new request referencing a particular cache line is received (in block 302), the corresponding counter is incremented (e.g. by the cache line status module 412) and after a request referencing a particular cache line is executed by the RAM control module 206 (in block 320), the corresponding counter is decremented (e.g. by the cache line status module 412). Only when the counter associated with a cache line is zero can the cache line be re-allocated to a different memory address (e.g. as part of a cache replacement policy in the event that there are no unallocated cache lines).

Figure 5:
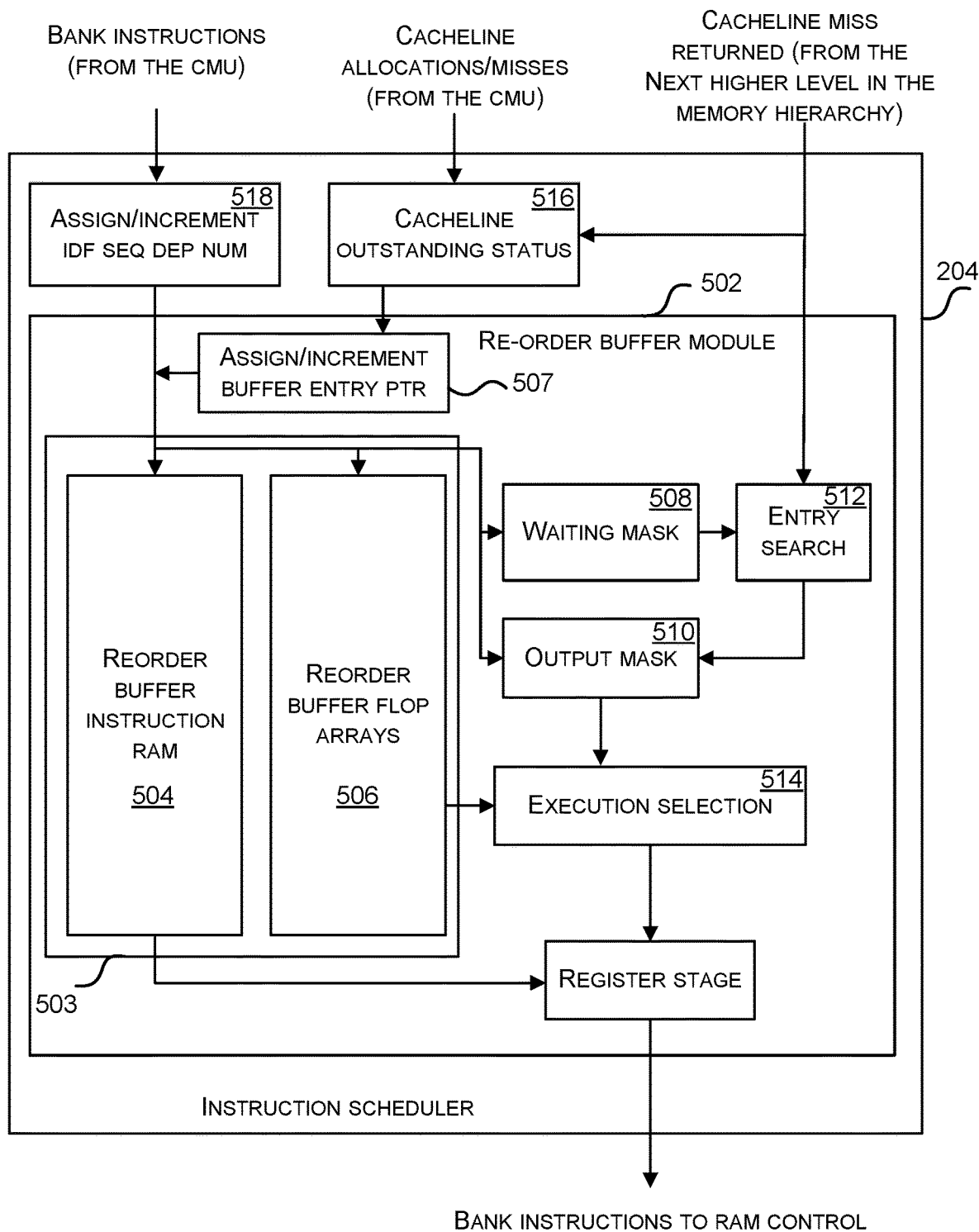
FIG. 5 is a schematic diagram showing an example instruction scheduler in more detail.

FIG. 5 is a schematic diagram showing an example instruction scheduler 204 in more detail. As described above, the instruction scheduler 204 is responsible for managing the re-ordering within the cache (or cache bank) 200 and determining (in block 318) the exact sequence of instructions that are then fed out for final execution in the RAM control module 206 (in block 320).

The instruction scheduler 204 comprises a re-order buffer module 502 which stores instructions received from the CMU 202 in a data structure 503 (in block 310). In the example shown in FIG. 5, the data structure 503 inside the re-order buffer module 502 comprises a RAM 504 and an array of registers 506 which are conceptually managed as a circular buffer, although unlike a strict circular buffer, entries are allowed to be picked out for execution in any order (where, as described above, this order is determined by a pre-defined execution policy). In order that the data structure 503 can be managed as a circular buffer, two pointers are maintained by the re-order buffer module 502 and in the example shown in FIG. 5, these pointers are managed by a pointer module 507. The two pointers that are maintained are a write pointer which points to the next entry in the circular buffer to be assigned and an oldest entry pointer (also referred to as the 'oldest pointer') which points to the oldest entry in the buffer (i.e. the oldest entry in data structure 503). The operation of the circular buffer and these two pointers is described in more detail below with reference to FIG. 6. Use of these two pointers allows the circular buffer (and hence the data storage 503) to be emptied out-of-order whilst ensuring that a newer read to a cache line cannot overtake an older write to the same address (which would otherwise result in the read returning an incorrect/ stale value).

Although FIG. 5 shows the data structure 503 comprising both a RAM 504 and an array of registers 506, in other examples, there may only be a RAM 504 (and no registers 506) or only an array of registers 506 (and no RAM 504). Alternatively, the data structure 503 may not be managed as a circular buffer and instead the data structure 503 may comprise a plurality of FIFOs (e.g. implemented in RAM and/or registers), one for each cache line.

In various examples, where the data structure 503 comprises both a RAM 504 and an array of registers 506 (e.g. as shown in FIG. 5), an incoming instruction, or part thereof (e.g. cacheline number information), may be stored in the array of registers 506 if any parts of the instruction are required prior to execution rand parts of the incoming instruction not stored in the registers (e.g. the burst length or flags which affect write instructions), or the entire incoming instruction, may be stored in the RAM 504. If the instruction is not required prior to execution by the RAM control 206, then the entire incoming instruction may be stored in the RAM 504 without any parts of the instruction being stored in the registers 506. By storing parts of the incoming instruction in registers, it increases the speed of searching all pending instructions, e.g. to find every instruction waiting for a particular cacheline. This searching is faster if some information is stored in registers because all pending instructions can be searched in one operation, whereas typically it is only possible to read one address from the RAM at a time. The RAM 504 and the registers 506 may be managed together (which reduces the complexity of the management) or managed separately.

The re-order buffer module 502 also sets the flags associated with stored entries (in blocks 312-316) and in the example shown in FIG. 5, these flags are implemented by means of two masks: a waiting mask 508 and an output mask 510. The waiting mask 508 is a data structure storing a series of bits which identify those stored instructions that cannot be executed (and hence a bit is set in the waiting mask in block 316) and the output mask 510 is a data structure storing a series of bits which identify those stored instructions that can be executed (and hence a bit is set in the output mask in block 314). The entry search module 512 in the re-order buffer 502 receives a signal indicating that data has been returned (in block 322) and then updates the masks (in blocks 312-316) accordingly (the actual returned data may be stored within the RAM control module 206). The operation of these masks is described in more detail below with reference to FIG. 6. Where a FIFO for each cache line is used instead of centralized storage which is managed like a circular buffer, masks may or may not be used to determine whether an instruction can or cannot be executed.

In an example using a FIFO, a mask may not be used and instead, once data for a cache line that missed ('No' in block 304) is returned (in block 322), all the entries stored in the FIFO for that cache line may be selected one by one (e.g. by popping each entry in turn from the FIFO). In such an example, the flag which is set to indicate whether an instruction can execute (in blocks 314 and 316) may therefore relate to the cache line/FIFO and hence by implication refer to the first entry in the FIFO.

The selection of instructions for execution (in block 318) is also performed within the re-order buffer module 502 and in the example shown in FIG. 5, this is implemented by an execution selection module 514. The execution selection module 514 selects an instruction for execution in any clock cycle based on the output mask 510 and a pre-defined execution policy.

Figure 6:
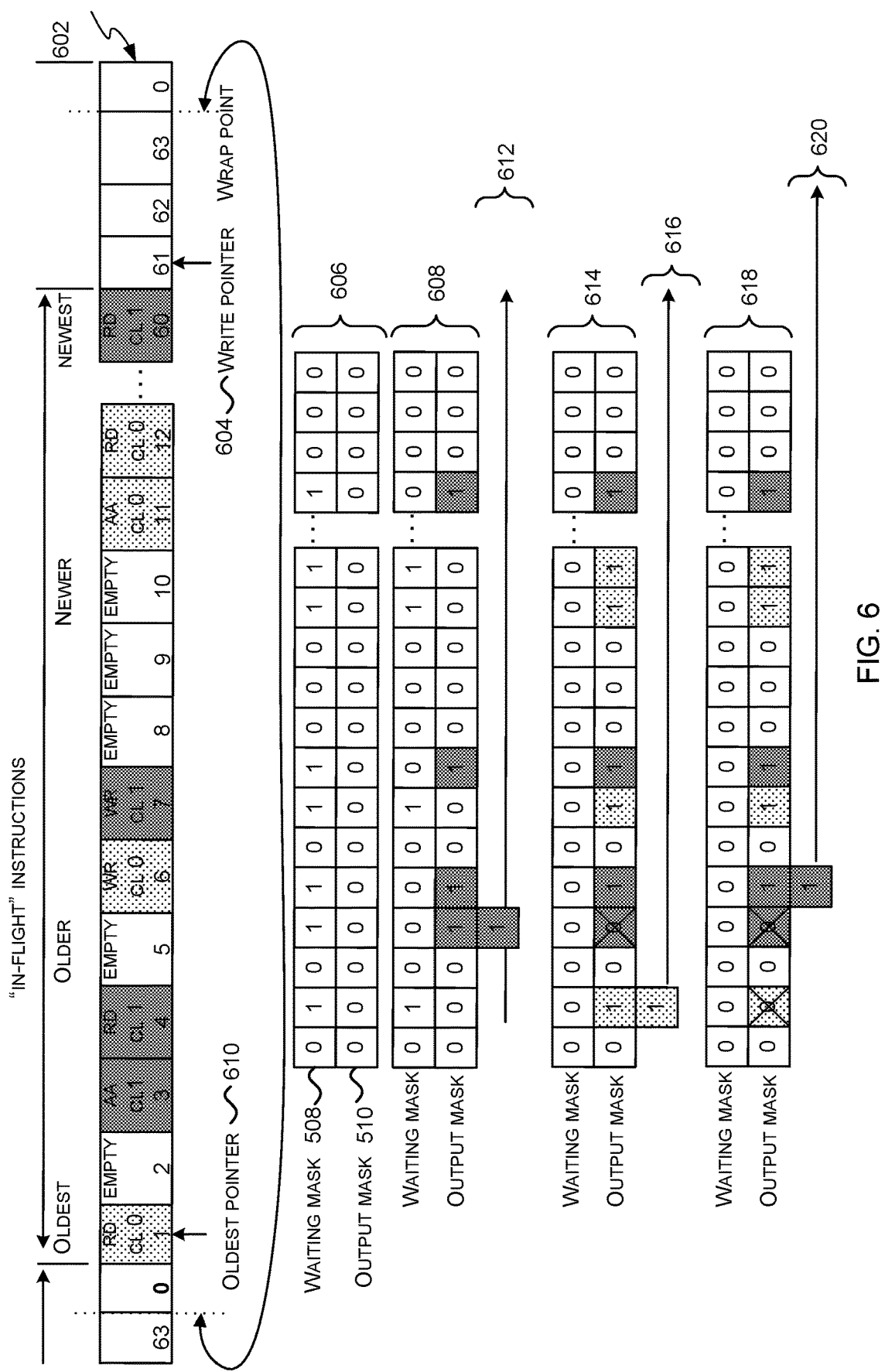
FIG. 6 is a schematic diagram illustrating an example operation of a circular buffer within an instruction scheduler as shown in FIG. 5.

An example of the operation of the re-order buffer module 502 can be described with reference to FIG. 6. FIG. 6 shows a schematic diagram of the circular buffer 602 (which corresponds to data structure 503 in FIG. 5) and in the example shown, a number of incoming instructions have been accepted into the circular buffer such that the write pointer 604 has gradually incremented to point at location 61 within the buffer 602. A number of instructions have then executed such as those at locations 0, 2 and 5 leaving gaps in the buffer marked as "empty" (i.e. the data in the circular buffer may fragment). The remaining entries in the buffer 602 may be considered to be two separate sets of instructions: a first set, comprising instructions at locations 1, 6, 11 and 12, are waiting on Cacheline 0 whilst the second set, comprising instructions at locations 2, 4, 7 and 60, are waiting on Cacheline 1. Both cache lines are assumed to be outstanding from memory (i.e. the initial instruction on each cache line could be considered a miss), and therefore in this initial state 606 all the instructions are in the waiting mask 508 and there is nothing in the output mask 510. Consequently, the re-order buffer module 502 will not be able to select an instruction for execution (in block 318).

Depending upon the particular cache hierarchy (e.g. where the external bus operates out-of-order as described above), the two outstanding cache lines may return in any order, therefore if, as shown in FIG. 6, Cacheline 1 returns before Cacheline 0, the instructions waiting on that cache line can be moved out of the waiting mask 508 and placed in the output mask 510 by the entry search module 512 (as shown in state 608) and now the execution selection logic 514 within the re-order buffer module 502 can select them (in block 318) for execution downstream by the RAM control module 206 (in block 320).

The execution selection logic 514 may be based on a rotated priority-encode (which encapsulates the execution policy described above) that uses the "oldest pointer" 610 within the buffer to determine which entries should be selected first. Once selected for execution (in block 318), the entries within the masks are cleared such that the priority encoder will select a new instruction on subsequent cycles. If on one of these cycles the oldest entry within the buffer 602 is executed, this potentially allows the "oldest pointer" 610 to be advanced so that it gradually moves towards the "write pointer" 604 as instructions execute freeing up more space for new incoming instructions to be accepted.

In the example shown in FIG. 6, following the return of Cacheline 1, the instruction at location 3 is selected for execution (as indicated in state 612) and the entry in the output mask 610 is cleared (as indicated by the cross in the entry in state 614).

If Cacheline 0 now returns, the instructions waiting on that cache line can be moved out of the waiting mask 508 and placed in the output mask 510 by the entry search module 512 (as shown in state 614) and now the execution selection logic 514 within the re-order buffer module 502 can also select them (in block 318) for execution downstream by the RAM control module 206 (in block 320).

In the next cycle, the execution selection logic 514 selects the new oldest entry using the oldest pointer 610 (state 616) and in this example, the instruction at location 1 is selected for execution and the entry in the output mask 610 is cleared (as indicated by the cross in the entry in state 618). As now all cache lines have returned, all the instructions are flagged in the output mask 510 (and not the waiting mask 508) and are waiting to be selected in age order, from oldest to newest (based on the oldest pointer 610).

As indicated by states 612, 616 and 620 in FIG. 6, as instructions are executed, the oldest pointer 610 slides upward towards the write pointer 604. The oldest pointer 610 does not necessarily increment by one each time an instruction is executed, because the buffer 602 is not emptied strictly in order. Execution of some instructions may not result in any change to the oldest pointer 610 (e.g. as shown in FIG. 6 when the instruction at location 3 is selected for execution) and some may result in the oldest pointer 610 moving by several locations (e.g. as shown in FIG. 6 when the instruction at location 1 is selected for execution, in which case the oldest pointer 610 moves from location 1 to location 4).

As shown in FIG. 4, the CMU 202 comprises a cache line status module 412 which tracks the status of each of the cache lines to ensure that there is only one outstanding miss per cache line. Each time the CMU 202 processes a miss ('No' in block 304), the cache line status module 412 raises a status bit corresponding to that particular cache line. This cache line outstanding bit remains high until the data relating to that miss returns from external memory and once it is returned, the cache line status module 412 resets the bit. As shown in FIG. 5, the instruction scheduler 204 comprises a cache line outstanding status module 516 which receives a message from the CMU each time the CMU allocates a cache line on a miss and therefore also tracks the status of each of the cache lines (e.g. using an outstanding bit corresponding to each cache line which may be set high or low). The outstanding bit on a cache line is used to categorise instructions when they enter the reorder buffer 503 within the instruction scheduler (e.g. if the outstanding bit corresponding to the cache line shows that the instruction is on a cache line which is still outstanding, then the waiting bit within the mask is set).

Although the tracking of the cache lines is shown as being split between the CMU 202 and instruction scheduler 204 as described above, it will be appreciated that the tracking may instead be split between the two modules in a different way or may be performed solely by either the CMU or the instruction scheduler.

If the on-chip cache 200 needs to support a write fence operation, the instruction scheduler 204 may comprise a module 518 (as shown in FIG. 5) which groups the incoming requests. In such examples, when a new request is received, it is assigned, by module 518, to the current dependency group (as identified by the current sequential dependency number, i.e. a number which increments sequentially). On receipt of a fence instruction, the instruction scheduler 204 passes this into the re-order buffer module 502 with the current sequential dependency number and then increments the sequential dependency number, such that all subsequently received requests will inherit a different value (and hence belong to a different dependency group). A fence pending flag may also be set. Unlike a normal instruction, a fence instruction (which may be considered to be a special tracking instruction) is not stored in the re-order buffer and does not relate to a particular cache line. The re-order buffer module 502 (e.g. the execution selection logic 514) uses the sequential dependency number in order to determine when it is safe for the fence instruction to execute, i.e. fence instructions are only executed when the pending write counter corresponding to the dependency number has decremented to zero.

Although not shown in FIG. 5, in various examples, the re-order buffer module 502 may comprise an additional module which throttles the instructions output by the instruction scheduler to the RAM control module 206 and hence throttles the data which is returned to requestors by the RAM control module 206. This additional module may assign an incrementing number per requestor to each pending instruction (where the incrementing number may be based on words of data, rather than just instructions, as an instruction may relate to more than one word of data) and this number may be referred to as a requestor sequence number. The additional module enforces a maximum number of sequence numbers that are allowed to be allocated to pending requests (and hence termed alive) at any time and once the limit is reached, subsequent requests are stalled. The allocated sequence numbers are additionally used to determine whether instructions are allowed to execute or not and this acts as a further condition (in addition to those described above in relation to the waiting and output masks). A window is defined which comprises a fixed number of sequence numbers (e.g. 8) and starts with the oldest instruction (for the particular requestor) that is pending. Each request originated at a requestor and so is controlled based on the window for that requestor. Only instructions within the window for the corresponding requestor can be selected (e.g. in the execution selection module 514) and executed by the RAM control module 206.

Figure 7:
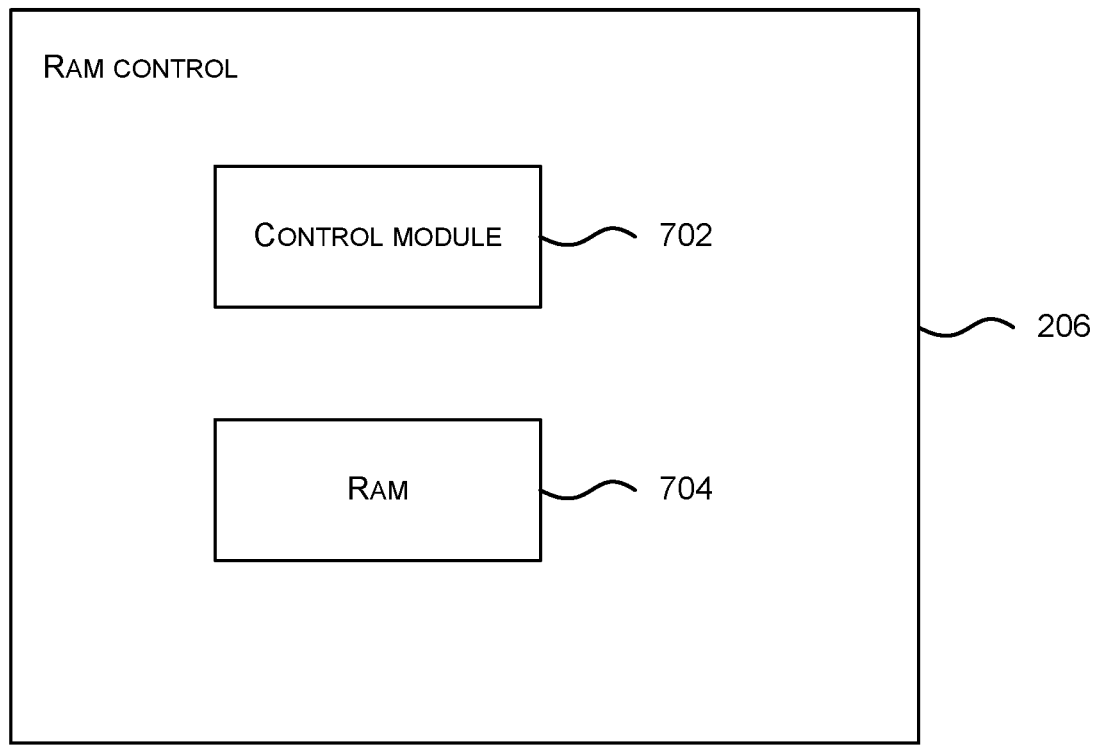
FIG. 7 is a schematic diagram showing an example RAM control module in more detail.

As shown in FIGS. 2 and 3, the RAM control module 206 forms the final stage of the cache instruction pipeline, executing instructions on the main cache RAM (in block 320) and returning read data back to the original requestors. The RAM control module 206 also forwards writeback data (which needs to be written back from the on-chip cache to the next level of memory hierarchy), e.g. via a converter module (where provided). As shown in FIG. 7, the RAM control module 206 comprises a control module 702 and the main cache RAM 704 (which comprises the cache lines and stores the cached data). The control module 702 receives a stream of cache instructions which the instruction scheduler 204 (and in particular the execution selection module 514) has determined are safe to execute.

In the description above, in the event of a cache miss ('No' in block 304), the CMU 202 generates a request to the next level in the memory hierarchy (in block 308). In some examples, the CMU 202 may generate two requests to the next level in the memory hierarchy (in block 308) in relation to a cache miss of a single memory request (received in block 302). In particular where the memory requests received from the lower level cache may relate to a read or a write (rather than just a read), a previous memory request may have written data to the cache 200 which has not yet been written back to next level of memory hierarchy (such a cache line is described as being 'dirty' and a bit may be set in relation to the cache line to indicate its status as dirty). If a dirty cache line needs to be evicted (i.e. reused for a different memory address), the data stored in the cache line needs to be written back to the next level of memory hierarchy before it is overwritten by a new read request. In such a situation, the CMU 202 generates two requests to the next level in the memory hierarchy: the first writing back the data currently stored in the cache line and the second replenishing the cache line with new data. The first request (which writes back the data) is issued before the second request (which replenishes the cache line with new data) and as a result of this the first request is always executed before the second request using the methods described herein.

Using the cache architecture and methods described herein, it is possible to accommodate requests going out-of-order in the interconnect fabric without requiring additional storage prior to the last on-chip cache to effect re-ordering and this reduces both the space occupied by the memory hierarchy and the power consumption. As described above the cache architecture and methods described herein may be used for the last on-chip cache or for any on-chip cache (e.g. for both the L1 and the L2 cache in the hierarchy shown in FIG. 1).

Low latency can be achieved for cache hits as they can overtake cache misses (on different cache lines) and this may, for example, be used to hide latency within a memory management unit (MMU) as slow misses can also overtake faster misses (i.e. later misses with data that returns more quickly can overtake subsequent cache misses with data that returns more slowly). High latency may be able to be hidden up to a depth of the circular buffer (where provided) such that, for example, if there is one instruction executed per clock cycle and the memory latency is 100 cycles, a circular buffer may be used which can store at least the 99 instructions which are received following the miss and before the corresponding data is returned from the external memory. Where a FIFO is used, the latency may be able to be hidden up to at least a depth of the most heavily used FIFO (e.g. where one particular FIFO fills up first and others remain empty), or more if the FIFOs are more evenly used.

As described above, using the cache architecture and methods described herein, the on-chip cache (and the memory hierarchy of which is part) has a higher utilization and lower average latency owing to the ability for hits to overtake misses thereby filling gaps where a cache would otherwise have been idle. The benefits are larger for larger on-chip caches because they have more cache lines and so can have a larger number of outstanding cache misses at any one time (and in various examples, the cache architecture may be used for caches over around 16 kB in size).

As described above, the cache architecture and methods described herein may be used for on-chip caches which operate in virtual or physical address space. Where the on-chip cache does not operate in the same address space as the next level in the memory hierarchy (and which receives requests generated by the cache), the intermediary module performs a conversion between address spaces (e.g. from a virtual address space to a physical address space) and hence may be referred to as a converter module.

FIGS. 2, 4, 5 and 7 are shown as comprising a number of functional blocks. This is schematic only and is not intended to define a strict division between different logic elements of such entities. Each functional block may be provided in any suitable manner.

Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. A computer or computer system may comprise one or more processors. Those skilled in the art will realize that such processing capabilities are incorporated into many different devices and therefore the term 'computer' includes set top boxes, media players, digital radios, PCs, servers, mobile telephones, personal digital assistants and many other devices.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a cache (e.g. an instruction scheduler) configured to perform any of the methods described herein, or to manufacture a cache comprising any apparatus described herein. An integrated circuit definition dataset may be, for example, an integrated circuit description.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a cache or a part thereof will now be described with respect to FIG. 8.

Figure 8:
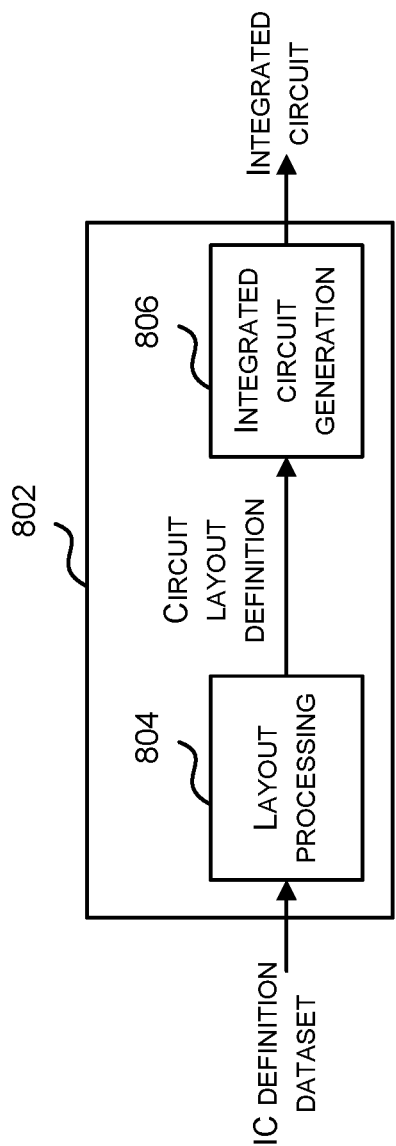
FIG. 8 shows an integrated circuit manufacturing system for generating an integrated circuit embodying an on-chip cache.

FIG. 8 shows an example of an integrated circuit (IC) manufacturing system 802 which comprises a layout processing system 804 and an integrated circuit generation system 806. The IC manufacturing system 802 is configured to receive an IC definition dataset (e.g. defining a cache, or part thereof, as described in any of the examples herein), process the IC definition dataset, and generate an IC according to the IC definition dataset (e.g. which embodies a cache, or part thereof, as described in any of the examples herein). The processing of the IC definition dataset configures the IC manufacturing system 1002 to manufacture an integrated circuit embodying a cache, or part thereof, as described in any of the examples herein.

The layout processing system 804 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 804 has determined the circuit layout it may output a circuit layout definition to the IC generation system 806. A circuit layout definition may be, for example, a circuit layout description.

The IC generation system 806 generates an IC according to the circuit layout definition, as is known in the art. For example, the IC generation system 806 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 806 may be in the form of computer-readable code which the IC generation system 806 can use to form a suitable mask for use in generating an IC.

The different processes performed by the IC manufacturing system 802 may be implemented all in one location, e.g. by one party. Alternatively, the IC manufacturing system 802 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a cache, or part thereof, without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 8 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 8, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. An instruction scheduler for use in an on-chip cache of a processor formed on a chip with the on-chip cache, the instruction scheduler comprising:
   a cache management unit arranged, in response to determining that a memory request generated in the processor refers to data that is not stored in the on-chip cache, to generate a memory request on a further level of a memory hierarchy; and
   a re-order buffer module arranged to control an order in which memory requests generated in the processor are executed within the on-chip cache such that request entries may be picked out for execution in any order, and comprising a data structure arranged to store pending memory requests, and wherein data is received from the further level of the memory hierarchy in an order that is different from an order in which the corresponding memory requests are generated in the processor.

2. The instruction scheduler according to claim 1, wherein the re-order buffer module further comprises:
   an execution selection module arranged to select a sequence of pending memory requests from the data structure for execution such that pending requests relating to an identical cache line are executed in age order and pending requests relating to different cache lines are executed in an order dependent upon when data relating to the different cache lines is received via the second input.

3. The instruction scheduler according to claim 2, further comprising an output arranged to output the sequence of pending memory requests for execution by a RAM control module in the on-chip cache.

4. The instruction scheduler according to claim 2, wherein the re-order buffer module further comprises a waiting mask arranged to identify pending requests that cannot be executed and an output mask arranged to identify pending requests that can be executed, and wherein the execution selection module is arranged to select the sequence of pending memory requests using the output mask.

5. The instruction scheduler according to claim 4, wherein the re-order buffer module further comprises logic arranged to update the waiting and output masks in response to data received from the further level of the memory hierarchy.

6. The instruction scheduler according to claim 1, wherein the data structure is managed as a circular buffer and the re-order buffer module is arranged to store a first pointer identifying an oldest entry in the data structure and a write pointer.

7. The instruction scheduler according to claim 6, wherein the data structure comprises RAM and an array of registers.

8. The instruction scheduler according to claim 1, wherein the data structure comprises one FIFO for each cache line in the cache.

9. The instruction scheduler according to claim 1, further comprising a cache line status module arranged to track a status of each cache line in the cache and in response to a cache miss on a particular cache line, to block execution of any subsequent memory requests generated in another on-chip cache and relating to the particular cache line until the corresponding data is received from the external memory.

10. The instruction scheduler according to claim 1, wherein the cache management unit further comprises logic arranged, in response to a received memory request, to determine whether data referred to in the request is stored in the cache.

11. The instruction scheduler according to claim 1, wherein the cache is a highest on-chip cache in the memory hierarchy, such that the further level of the memory hierarchy is a memory external to the processor.

12. The instruction scheduler according to claim 1, wherein the memory requests refer to data in a virtual address space.

13. The instruction scheduler according to claim 12, wherein the further level of the memory hierarchy operates in a physical address space and wherein the cache management unit is arranged to output the generated memory requests to a converter module for conversion from the virtual address space to the physical address space before transmission of the request to the further level of the memory hierarchy.

14. A method of operating an instruction scheduler for use in an on-chip cache of a processor formed on a chip with the on-chip cache, the method comprising:
   determining if a memory request generated in the processor refers to data that is not stored in the on-chip cache;
   in response to determining that the memory request refers to data that is not stored in the on-chip cache, generating a memory request on a further level of a memory hierarchy; and
   controlling an order in which the memory requests generated in the processor are executed within the on-chip cache such that request entries may be picked out for execution in any order, wherein controlling an order in which the received memory requests are executed-within the on-chip cache comprises:
   selecting a sequence of pending memory requests from the data structure for execution such that pending requests relating to an identical cache line are executed in age order and pending requests relating to different cache lines are executed in an order dependent upon when data relating to the different cache lines is received from the further level in the memory hierarchy.

15. The method according to claim 14, wherein the sequence of pending memory requests is selected using an output mask arranged to identify pending requests that can be executed.

16. The method according to claim 15, further comprising:
   storing a waiting mask arranged to identify pending requests that cannot be executed; and
   updating the waiting and output masks in response to data received from the further level in the memory hierarchy.

17. A non-transitory computer readable storage medium having stored thereon an integrated circuit definition dataset that, when processed in an integrated circuit manufacturing system, configures the integrated circuit manufacturing system to manufacture an instruction scheduler for use in an on-chip cache of a processor formed on a chip with the on-chip cache, the instruction scheduler comprising:
   a cache management unit arranged, in response to determining that a received memory request generated in the processor refers to data that is not stored in the on-chip cache, to generate a memory request on a further level of a memory hierarchy; and
   a re-order buffer module arranged to control an order in which memory requests generated in the processor are executed within the on-chip cache such that request entries may be picked out for execution in any order, and comprising a data structure arranged to store pending memory requests, and wherein data is received from the further level of the memory hierarchy in an order that is different from an order in which the corresponding memory requests are generated in the processor.

* * * * *